US011522245B2

(12) United States Patent
Lee et al.

(10) Patent No.: US 11,522,245 B2
(45) Date of Patent: Dec. 6, 2022

(54) ENERGY STORAGE APPARATUS USING HOOK STRUCTURE, AND ENERGY STORAGE SYSTEM COMPRISING ENERGY STORAGE APPARATUS

(71) Applicant: LG Chem, Ltd., Seoul (KR)

(72) Inventors: Seung-Yoon Lee, Daejeon (KR);
Jong-Hyun Jo, Daejeon (KR);
Gyung-Soo Kang, Daejeon (KR);
Yong-Il Kim, Daejeon (KR);
Yong-Seok Choi, Daejeon (KR)

(73) Assignee: LG Energy Solution, Ltd.

( * ) Notice: Subject to any disclaimer, the term of this patent is extended or adjusted under 35 U.S.C. 154(b) by 165 days.

(21) Appl. No.: 16/627,111

(22) PCT Filed: Mar. 12, 2019

(86) PCT No.: PCT/KR2019/002850
§ 371 (c)(1),
(2) Date: Dec. 27, 2019

(87) PCT Pub. No.: WO2019/177342
PCT Pub. Date: Sep. 19, 2019

(65) Prior Publication Data
US 2020/0161612 A1 May 21, 2020

(30) Foreign Application Priority Data
Mar. 12, 2018 (KR) .................. 10-2018-0028608

(51) Int. Cl.
*H01M 50/20* (2021.01)

(52) U.S. Cl.
CPC ........ *H01M 50/20* (2021.01); *H01M 2220/10* (2013.01)

(58) Field of Classification Search
None
See application file for complete search history.

(56) References Cited

U.S. PATENT DOCUMENTS

| 5,903,132 A | 5/1999 | Ohira et al. |
| 2012/0111654 A1 | 5/2012 | Origuchi |

(Continued)

FOREIGN PATENT DOCUMENTS

| CN | 1183689 A | 6/1998 |
| CN | 202345359 U | 7/2012 |

(Continued)

OTHER PUBLICATIONS

International Search Report from Application No. PCT/KR2019/002850 dated Jul. 3, 2019, 2 pages.

(Continued)

*Primary Examiner* — Wyatt P McConnell
(74) *Attorney, Agent, or Firm* — Lerner, David, Littenberg, Krumholz & Mentlik, LLP

(57) ABSTRACT

An energy storage device includes: a battery rack fixedly installed in a building or a container and having a partitioned space; and a plurality of battery modules installed in the partitioned space of the battery rack, wherein each of the plurality of battery modules is inserted into the battery rack in a sliding manner, wherein a front surface of each of the plurality of battery modules is fixed to the battery rack with a bolt, and wherein a rear surface of each of the plurality of battery modules is fixed to the battery rack with a hook.

4 Claims, 4 Drawing Sheets

(56) References Cited

U.S. PATENT DOCUMENTS

| | | | |
|---|---|---|---|
| 2013/0186700 A1 | 7/2013 | Choo et al. | |
| 2013/0273403 A1* | 10/2013 | Saruhashi | H01M 50/24 429/99 |
| 2013/0313953 A1 | 11/2013 | Lee et al. | |
| 2014/0205864 A1 | 7/2014 | Yi et al. | |
| 2015/0295214 A1 | 10/2015 | Cho et al. | |
| 2015/0303419 A1 | 10/2015 | Hachiya et al. | |
| 2015/0333303 A1 | 11/2015 | Hachiya et al. | |
| 2016/0056428 A1 | 2/2016 | Kim | |
| 2017/0133641 A1 | 5/2017 | Lee | |
| 2017/0133642 A1* | 5/2017 | Lee | H01M 50/291 |
| 2017/0194674 A1 | 7/2017 | Lee et al. | |

FOREIGN PATENT DOCUMENTS

| | | | |
|---|---|---|---|
| CN | 102714292 A | | 10/2012 |
| CN | 103943900 A | | 7/2014 |
| EP | 2530765 A2 | | 12/2012 |
| JP | H04283997 A | | 10/1992 |
| JP | 2001023698 A | | 1/2001 |
| JP | 2013518386 A | | 5/2013 |
| JP | 2014143180 A | | 8/2014 |
| KR | 20120028975 A | | 3/2012 |
| KR | 101278506 B1 | | 7/2013 |
| KR | 20150007727 A | | 1/2015 |
| KR | 20150117015 A | | 10/2015 |
| KR | 20170019212 A | | 2/2017 |
| KR | 20170049382 A | | 5/2017 |
| KR | 20170054100 A | | 5/2017 |
| KR | 20170054881 A | | 5/2017 |
| KR | 101799537 B1 | | 11/2017 |
| KR | 101808310 B1 | | 12/2017 |
| KR | 101826932 B1 | | 2/2018 |
| WO | 2012102383 A1 | | 8/2012 |
| WO | 2014073524 A1 | | 5/2014 |
| WO | 2014073544 A1 | | 5/2014 |

OTHER PUBLICATIONS

European Search Report for Application No. EP19767347 dated Oct. 30, 2020, 6 pages.
Search Report dated Nov. 11, 2021 from Office Action for Chinese Application No. 201980003538.9 dated Nov. 22, 2021. 3 pgs.
Search Report dated Apr. 11, 2022 from Office Action for Chinese Application No. 201980003538.9 dated Apr. 19, 2022. 2 pgs.

* cited by examiner

ENERGY STORAGE APPARATUS USING HOOK STRUCTURE, AND ENERGY STORAGE SYSTEM COMPRISING ENERGY STORAGE APPARATUS

CROSS-REFERENCE TO RELATED APPLICATIONS

The present application is a national phase entry under 35 U.S.C. § 371 of International Application No. PCT/KR2019/002850, filed Mar. 12, 2019, which claims priority to Korean Patent Application No. 10-2018-0028608 filed on Mar. 12, 2018 in the Republic of Korea, the disclosures of which are incorporated herein by reference.

TECHNICAL FIELD

The present disclosure relates to an energy storage device having a hook structure and an energy storage system including the energy storage device, and more particularly, to an energy storage device in which a hook structure is applied to a module guide of a battery rack to reinforce a fixing force between the battery module and the battery rack when installing the battery module to the battery rack, and an energy storage system including the energy storage device.

BACKGROUND ART

When a battery rack and a battery module are fastened, a front surface of the battery module may be fastened to a front frame by bolting, but a rear surface of the battery module is not able to be fastened by bolting due to structures such as an inner wall surface of a building or an inner wall surface of a container. For this reason, the fixing structure is not applied, but the rear surface of the battery module is installed just to be placed on the module guide.

That is, an energy storage device for mass energy storage is fixed on the inner wall surface of the building or the inner wall surface of the container. For this, when fixing the battery module installed to the battery rack, it is difficult to perform the bolting work to the rear surface of the battery module, which faces the inner wall surface of the building or the inner wall surface of the container, and thus the fixing structure may not be applied thereto, unlike the front surface of the battery module.

Since the rear surface of the battery module is not fixed to the battery rack but simply placed thereon, if vibration occurs in the building or the container, the battery rack may be damaged due to the movement of the battery module.

In addition, if the rear surface of the battery module is not fixed but moved due to vibration, the impact caused by the load and vibration of the battery module is concentrated on the front surface of the battery module, which may break the fixing portion of the front surface of the battery module, thereby increasing the risk of damage of the battery module.

DISCLOSURE

Technical Problem

The present disclosure is designed to solve the problems of the related art, and therefore the present disclosure is directed to providing an energy storage device, which has a reinforced fixing force while ensuring easy coupling and separation of a battery module and a battery rack, when the battery module is installed to the battery rack.

However, the technical problem to be solved by the present disclosure is not limited to the above, and other objects not mentioned herein will be understood from the following description by those skilled in the art.

Technical Solution

In one aspect of the present disclosure, there is provided an energy storage device, comprising: a battery rack fixedly installed in a building or a container and having a partitioned space; and a plurality of battery modules installed in the partitioned space of the battery rack, wherein each of the plurality of battery modules is inserted into the battery rack in a sliding manner, wherein a front surface of each of the plurality of battery modules is fixed to the battery rack with a bolt, and wherein a rear surface of each of the plurality of battery modules is fixed to the battery rack with a hook.

The battery rack may include: a base frame fixed on a bottom surface of the building or the container; a plurality of front frames disposed to stand up on the base frame and disposed at locations corresponding to the front surfaces of the plurality of battery modules; a plurality of rear frames disposed to stand up on the base frame and disposed at locations corresponding to the rear surfaces of the plurality of battery modules; and an upper frame disposed on the plurality of front frames and the plurality of rear frames to cover an inner space of the battery rack.

The battery rack may further include a module guide fixed on at least one of the plurality of front frames and at least one of the plurality of rear frames to support a portion of a side surface and a portion of a lower surface of one of the plurality of battery modules, the module guide partitioning the inner space in the battery rack.

The module guide may include a hook unit formed at one end thereof to fix the rear surface of the one of the plurality of battery modules.

The one of the plurality of battery modules may have a hook insert hole formed in the rear surface thereof.

The one of the plurality of battery modules may be inserted by sliding along the module guide and disposed in the inner space of the battery rack.

When the one of the plurality of battery modules is inserted by sliding, an end of the hook unit may be fixed as an inner surface of the end of the hook unit comes into contact with an inner wall surface of the hook insert hole at a lower side thereof.

When the one of the plurality of battery modules is completely inserted, the end of the hook unit may be elastically deformed due to an upward force received by the inner wall surface of the hook insert hole at the lower side thereof to apply a downward pressure to the one of the plurality of battery modules so that the one of the plurality of battery modules is fixed.

Meanwhile, an energy storage system according to an embodiment of the present disclosure comprises: an energy repository selected from a building and a container; and an energy storage device according to an embodiment of the present disclosure fixedly installed in the energy repository.

Advantageous Effects

According to an embodiment of the present disclosure, when the battery module is installed to the battery rack, the fixing force may be reinforced while ensuring easy coupling and separation of the battery module and the battery rack.

In addition, since the fixing force between the battery module and the battery rack is reinforced as above, even though vibrations are generated in a repository such as a building or a container where the energy storage device is installed so that a vibration shock is transmitted to the energy storage device, the coupled portion of the battery module and the battery rack is diversified to disperse impacts, and thus it is possible to minimize the occurrence of defects such as breakage of the fixed portion.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

First, an overall structure of an energy storage device according to an embodiment of the present disclosure will be described with reference to FIGS. 1 to 4.

Figure 1:
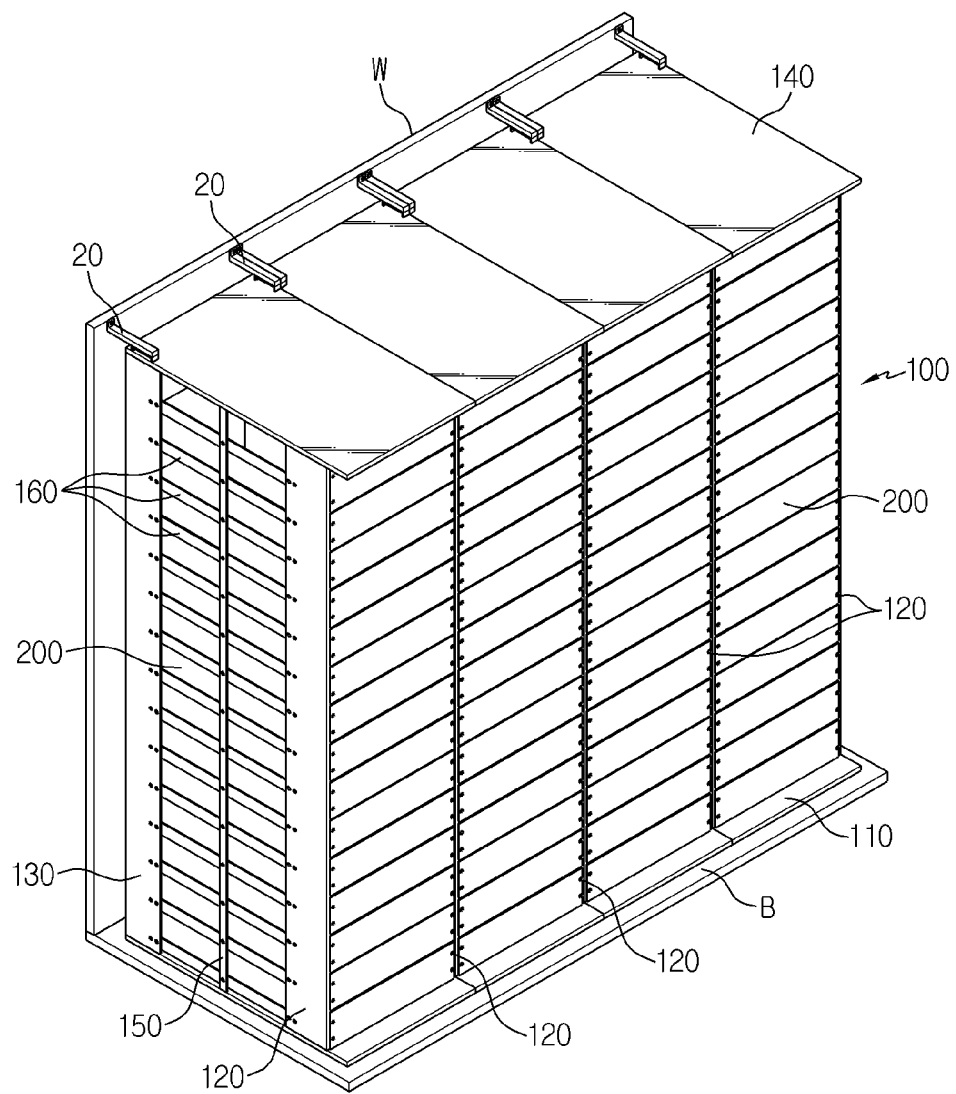
FIG. 1 is a diagram showing that an energy storage device according to an embodiment of the present disclosure is installed in an energy repository.
Figure 2:
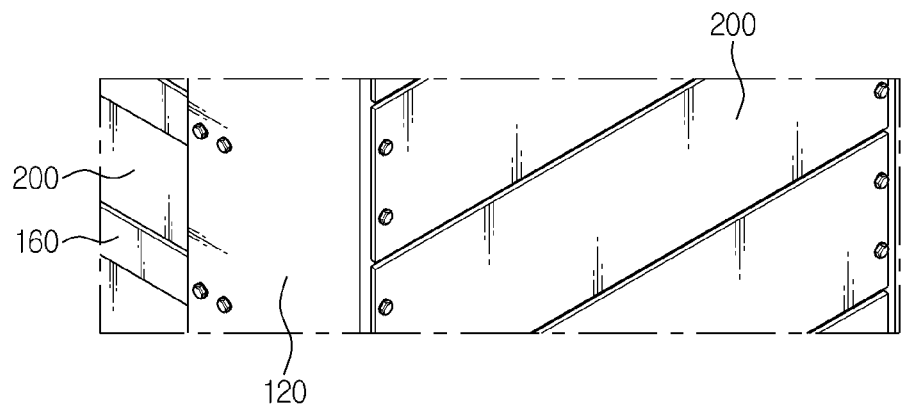
FIG. 2 is a partially enlarged view of FIG. 1 and shows that a front surface of a battery module applied to the energy storage device according to an embodiment of the present disclosure is fixed to a battery rack.
Figure 3:
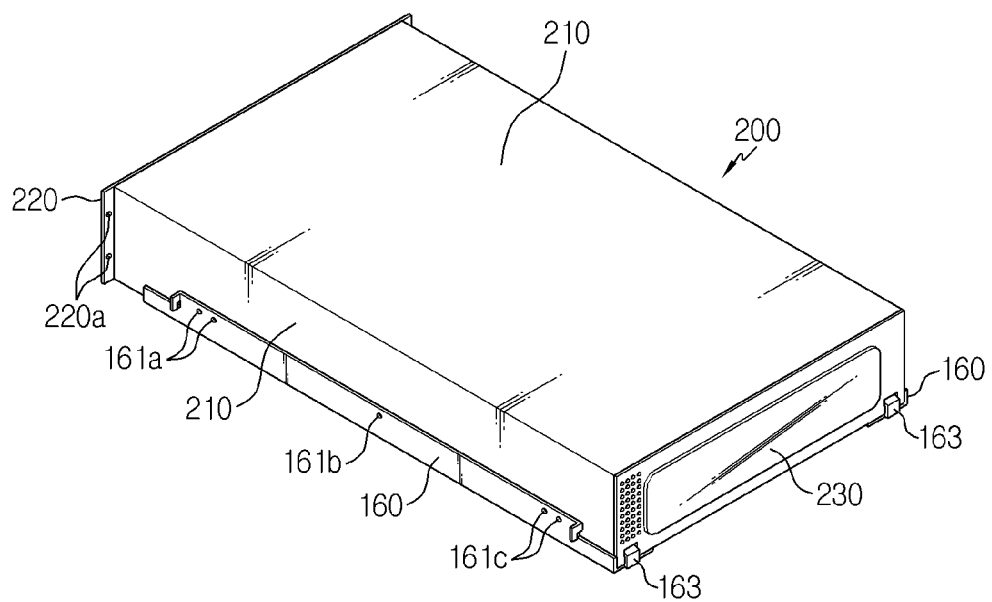
FIG. 3 is a diagram showing that the battery module applied to the present disclosure is coupled to a module guide.
Figure 4:
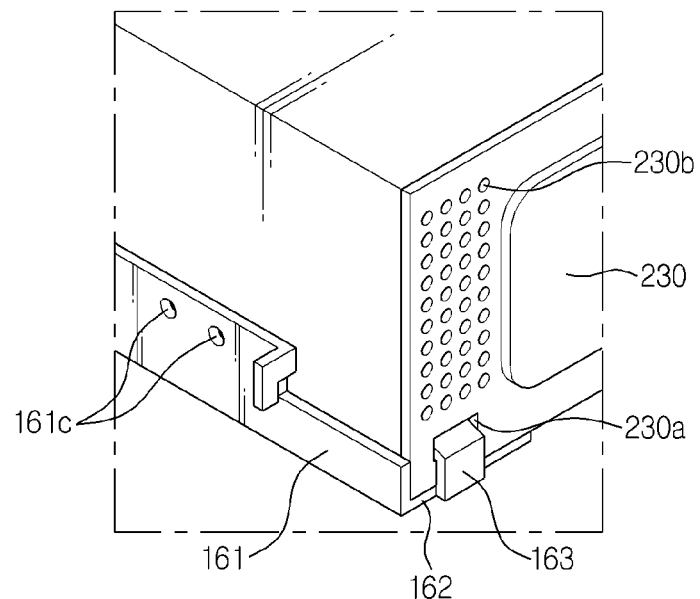
FIG. 4 is a partially enlarged view of FIG. 3 and shows that the battery module is coupled to the module guide in a hook type.

FIG. 1 is a diagram showing that an energy storage device according to an embodiment of the present disclosure is installed in an energy repository, and FIG. 2 is a partially enlarged view of FIG. 1 and shows that a front surface of a battery module applied to the energy storage device according to an embodiment of the present disclosure is fixed to a battery rack. Also, FIG. 3 is a diagram showing that the battery module applied to the present disclosure is coupled to a module guide, and FIG. 4 is a partially enlarged view of FIG. 3 and shows that the battery module is coupled to the module guide in a hook type.

First, referring to FIG. 1, an energy storage device according to an embodiment of the present disclosure is implemented to include a battery rack 100 and a plurality of battery modules 200 fixedly installed in an inner space of the battery rack 100. A plurality of energy storage devices may be fixedly installed in a repository such as a building or a container to configure an energy storage system.

The battery rack 100 is fixedly installed in the repository and has a partitioned space such that the battery modules 200 are inserted therein. The battery rack 100 includes a base frame 110, a front frame 120, a rear frame 130, an upper frame 140, and a module guide 160. Also, the battery rack 100 may further include a reinforcing frame 150 for reinforcing the structural stiffness.

The base frame 110 is fixed to a bottom surface B of the repository, and the base frame 110 and the bottom surface B may be fixed by bolting or the like.

The front frame 120 is disposed to stand up on the base frame 110 and is disposed at a location corresponding to the front surface of the battery module 200. A plurality of front frames 120 are disposed to be spaced apart from each other, and a distance between the adjacent front frames 120 corresponds to a width of the front surface of the battery module 200.

Like the front frame 120, the rear frame 130 is disposed to stand up on the base frame 110 and extends in a direction parallel to the front frame 120. The rear frame 130 is disposed at a location corresponding to the rear surface of the battery module 200. A plurality of rear frames 130 are disposed to be spaced apart from each other, and a gap between the adjacent rear frames 130 corresponds to a width of the rear surface of the battery module 200.

In the present disclosure, the battery module 200 may have a substantially rectangular parallelepiped shape. If the battery module 200 has a rectangular parallelepiped shape as above, the gap between the adjacent front frames 120 may be identical to the gap between the adjacent rear frames 130.

Although not shown in the figures, the rear frame 130 may be fixed to an inner wall surface W of the repository by using a separate structure in order to minimize the movement of the battery rack 100. However, even if the rear frame 130 is coupled to the inner wall surface W of the repository, a certain gap should be maintained between the wall surface W and the rear frame 130.

Since the energy storage device according to an embodiment of the present disclosure is cooled by means of a cooling hole 230b (see FIG. 4) formed in the rear surface of the battery module 200 as described later, a space is formed between the inner wall surface W of the repository and the back surface of the energy storage device to smoothly introduce and discharge cooling air and heated air.

The upper frame 140 is disposed in parallel with the base frame 110 on the front frame 120 and the rear frame 130 to cover the inner space of the battery rack 100. The upper frame 140 may be fixed to the inner wall surface W of the repository by using a separate structure in order to minimize the movement of the battery rack 100.

The reinforcing frame 150 may be applied to reinforce the structural rigidity of the battery rack 100, which may be insufficient just with the front frame 120 and the rear frame 130. The reinforcing frame 150 may extend in a direction parallel to the front frame 120 and the rear frame 130 by the same length as the front frame 120 and the rear frame 130, and the reinforcing frame 150 is disposed between the front frame 120 and the rear frame 130.

Referring to FIGS. 1 to 3, the module guide 160 is in contact with a portion of the lower surface and a portion of the side surface of the battery module 200 inserted into the battery rack 100 to support the battery module 200. The module guide 160 is coupled to the front frame 120, the rear frame 130 and the reinforcing frame 150 to partition the space inside the battery rack 100.

That is, the module guide 160 partitions the space inside the battery rack 100 along the horizontal direction and the vertical direction so that a plurality of the battery modules 200 may be inserted into the battery rack 100 by sliding in a plurality of layers and rows.

Referring to FIGS. 3 and 4, the module guide 160 includes a side cover 161 for covering a portion of the lower portion of the side surface of the battery module 200 and a lower cover 162 for covering a portion of one side of the lower surface of the battery module 200.

The side cover 161 may have a plurality of fastening holes 161a, 161b, 161c spaced apart from each other along the longitudinal direction. Among the fastening holes 161a, 161b, 161c, the first fastening hole 161a is formed at a position corresponding to the front frame 120, the second fastening hole 161b may be formed at a position corresponding to the reinforcing frame 150, and the third fastening hole 161c is formed at a position corresponding to the rear frame 130.

In the present disclosure, if the reinforcing frame 150 is not applied, only the first fastening hole 161a and the third fastening hole 161c are formed in the side cover 161, and the second fastening hole 161b may not be formed. The fastening holes 161a, 161b, 161c give a bolting space so that the module guide 160 may be coupled to the frames 120, 130, 150 in a bolting manner.

The module guide 160 is provided to both sides of the battery module 200 in the width direction one by one to support the battery module 200 at both sides in the width direction.

Meanwhile, the module guide 160 has a hook unit 163. The hook unit 163 is formed at one end of the lower cover 162 to fix the rear surface of the battery module 200.

The detailed shape of the hook unit 163 and its specific coupling mechanism with the battery module 200 will be described later in detail with reference to FIGS. 5 to 7.

Subsequently, referring to FIGS. 1 to 4, the battery module 200 is inserted into the battery rack 100 in a direction toward the wall surface W of the repository through an opening in the front surface of the battery rack 100. The front surface of the battery module 200 is fixed to the battery rack 100 in a bolt-type coupling manner, and the rear surface of the battery module 200 is fixed to the battery rack 100 in a hook-type coupling manner.

The battery module 200 is provided in plural, and as described above, the plurality of battery modules 200 are inserted into the inner space of the battery rack 100, partitioned by the module guide 160, by sliding.

The battery module 200 includes a plurality of battery cells (not shown), a module cover 210 for covering some surfaces of a cell stack where the plurality of battery cells are stacked, a front cover 220 for covering a front surface of the cell stack, and a rear cover 230 for covering a rear surface of the cell stack.

The module cover 210 forms an upper surface, a lower surface and both side surfaces of the battery module 200, and the front cover 220 and the rear cover 230 form a front surface and a rear surface of the battery module 200, respectively.

That is, in a state where the battery module 200 is installed in the battery rack 100, the front cover 220 covers the opening in the front surface of the battery rack 100, and the rear cover 230 faces the wall surface W of the repository.

Referring to FIG. 3, the front cover 220 has front surface fastening holes 220a formed at both ends thereof in the longitudinal direction for bolting, and the front cover 220 is fixed on the front frame 120 using the front surface fastening holes 220a by bolting.

That is, each battery module 200 is inserted on a pair of module guides 160 by sliding and disposed in the inner space of the battery rack 100. Also, the rear surface of the battery module 200 is fixed to the module guide 160 in a hook-type coupling manner as described above, and the front surface of the battery module 200 is fixed on the front frame 120 in a bolt-type coupling manner.

Meanwhile, the rear cover 230 has a pair of hook insert holes 230a formed at lower portions of both ends in the longitudinal direction for the hook-type coupling described above. Also, the rear cover 230 may have a plurality of cooling holes 230b, through which the heat generated from the battery cells may be discharged to the outside.

Next, the principle of fixing the rear surface of the battery module 200 to the module guide 160 according to an embodiment of the present disclosure will be described in detail with reference to FIGS. 5 to 7 along with FIGS. 1 to 4.

Figure 5:
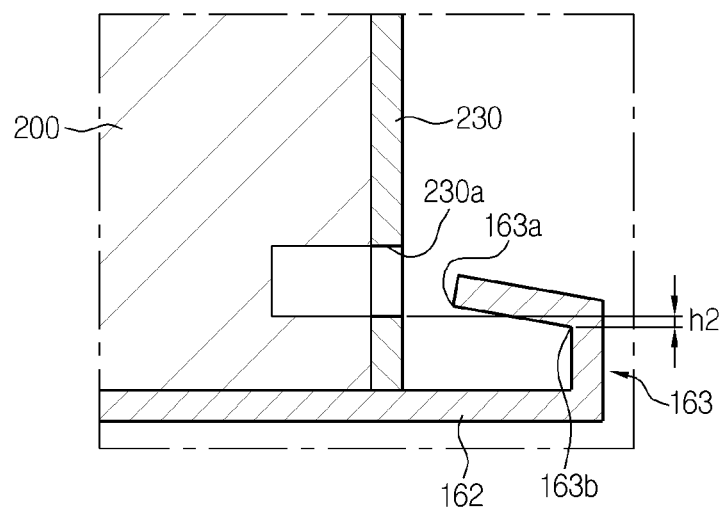
FIGS. 5 to 7 are diagrams for illustrating a process of coupling the battery module to the module guide applied to the present disclosure and respectively show before a hook unit is inserted into a hook insert hole, after the hook unit is inserted into the hook insert hole, and after the hook unit and the hook insert hole are completely coupled.
Figure 6:
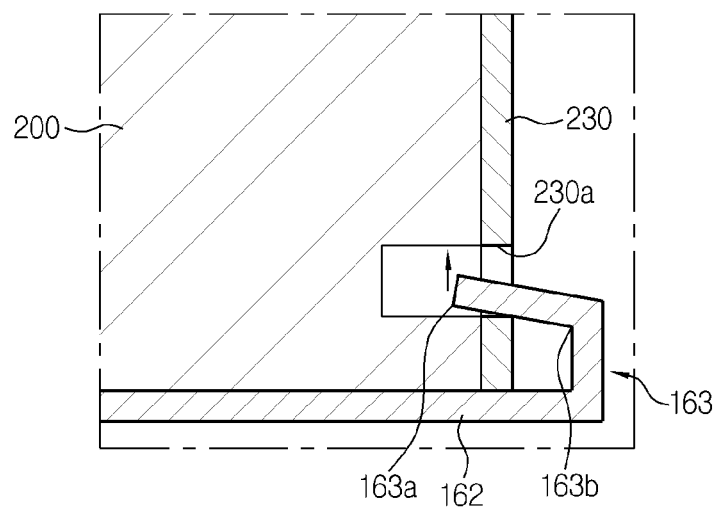
Figure 7:
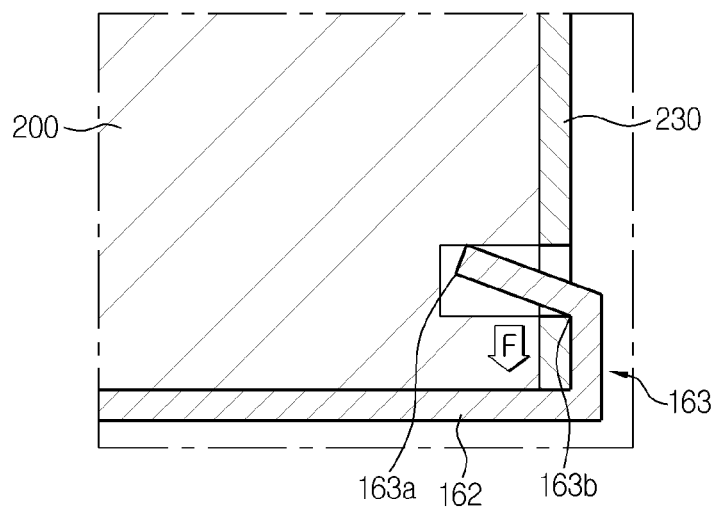

FIGS. 5 to 7 are diagrams for illustrating a process of coupling the battery module to the module guide applied to the present disclosure and respectively show before a hook unit is inserted into a hook insert hole, after the hook unit is inserted into the hook insert hole, and after the hook unit and the hook insert hole are completely coupled.

Referring to FIGS. 5 to 7 along with FIGS. 1 to 4, the hook unit 163 is inserted into the hook insert hole 230a formed in the rear surface of the battery module 200 while the battery module 200 is being inserted into the battery rack 100. At this time, the hook unit 163 is inserted in a direction from the rear surface of the battery module 200 toward the front surface thereof.

At the initial stage of insertion of the hook unit 163, there is no contact between the inner surface of the hook insert hole 230a and the hook unit 163, so that insertion is performed without resistance. However, as the depth of insertion increases, the inner wall surface of the hook insert hole 230a at a lower side thereof makes contact with the inner surface of the hook unit 163. Accordingly, in order for the hook unit 163 to be completely inserted into the hook insert hole 230a, a force is applied to the battery module 200 in a direction from the front surface toward the rear surface, and thus the hook unit 163 is inserted into the hook insert hole 230a in a tight-fitting manner.

For the insertion by tight-fitting, when the insertion starts, an insertion start point 163a of the hook unit 163 is positioned higher than the inner wall surface of the lower side of the hook insert hole 230a of the battery module 200, and an insertion end point 163b is positioned lower by a predetermined height h2 than the inner wall surface of the lower side of the hook insert hole 230a of the battery module 200 (see FIG. 5).

The end of the hook unit 163 is shaped so that an inner surface thereof is inclined upward along a direction from the insertion start point 163a toward the insertion end point 163b. Due to this configuration, the hook unit 163 is inserted into the hook insert hole 230a in a tight-fitting manner, and thus the end of the hook unit 163 applies a pressure F to the battery module 200 downward.

That is, when the battery module 200 is completely inserted into the battery rack 100, the end of the hook unit 163 is elastically deformed due to an upward force received by the inner wall surface of the lower side of the hook insert hole 230a to apply a downward pressure to the battery module 200, thereby fixing the battery module 200 onto the module guide 160. As a result, even if vibration occurs in the repository, the battery modules 200 installed in the battery rack 100 may be prevented from moving.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. An energy storage device, comprising:
    a battery rack fixedly installed in a building or a container and having a partitioned space; and
    a plurality of battery modules installed in the partitioned space of the battery rack,
    wherein each of the plurality of battery modules is inserted into the battery rack in a sliding manner,
    wherein a front surface of each of the plurality of battery modules is fixed to the battery rack with a bolt, and
    wherein a rear surface of each of the plurality of battery modules is fixed to the battery rack with a hook,
    wherein the battery rack includes:
        a base frame fixed on a bottom surface of the building or the container;
        a plurality of front frames disposed to stand up on the base frame and disposed at locations corresponding to the front surfaces of the plurality of battery modules;
        a plurality of rear frames disposed to stand up on the base frame and disposed at locations corresponding to the rear surfaces of the plurality of battery modules;
        an upper frame disposed on the plurality of front frames and the plurality of rear frames to cover an inner space of the battery rack; and
        a module guide fixed on at least one of the plurality of front frames and at least one of the plurality of rear frames to support a portion of a side surface and a portion of a lower surface of one of the plurality of battery modules, the module guide partitioning the inner space in the battery rack,
    wherein the module guide includes a hook unit formed at one end thereof to fix the rear surface of the one of the plurality of battery modules,
    wherein the one of the plurality of battery modules has a hook insert hole formed in the rear surface thereof,
    wherein when the one of the plurality of battery modules is inserted by sliding along the module guide and disposed in the inner space of the battery rack, an end of the hook unit is fixed as an inner surface of the end of the hook unit comes into contact with an inner wall surface of the hook insert hole at a lower side thereof, and
    wherein when the one of the plurality of battery modules is completely inserted, the end of the hook unit is elastically deformed due to an upward force received by the inner wall surface of the hook insert hole at the lower side thereof to apply a downward pressure to the one of the plurality of battery modules so that the one of the plurality of battery modules is fixed.

2. An energy storage system, comprising:
    an energy repository selected from a building and a container; and
    the energy storage device defined in claim 1, which is fixedly installed in the energy repository.

3. The energy storage device according to claim 1, wherein the module guide partitions the inner space in the battery rack along a vertical direction so that the plurality of battery modules is installed in the battery rack in a plurality of rows.

4. The energy storage device according to claim 1, wherein the inner surface of the end of the hook unit of the one of the plurality of battery modules is inclined upward.

* * * * *